Figure 1:
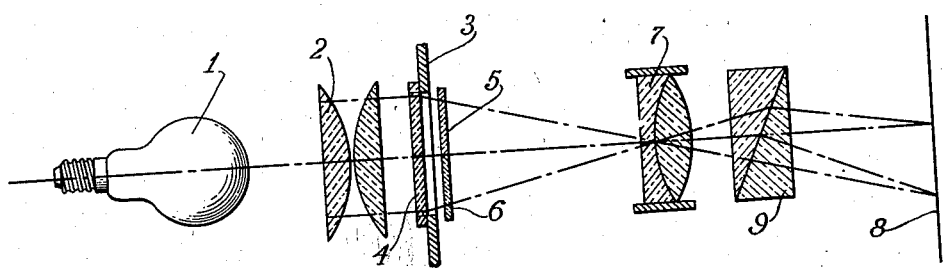

May 6, 1941.  H. SAUER  2,241,041

MEANS FOR PROJECTING STEREOSCOPIC PICTURES

Filed Feb. 11, 1939

Inventor:
Hans Sauer
By: B. Singer & F. Stern
Attorneys.

Patented May 6, 1941

2,241,041

UNITED STATES PATENT OFFICE 2,241,041

MEANS FOR PROJECTING STEREOSCOPIC PICTURES

Hans Sauer, Dresden, Germany, assignor to Zeiss Ikon Aktiengesellschaft, Dresden, Germany Application February 11, 1939, Serial No. 255,991
In Germany February 12, 1938

9 Claims. (Cl. 88—16.6)

The invention relates to improvements in means for projecting stereoscopic pictures.

It has been proposed heretofore to eliminate the secondary images which appear when projecting stereoscopic pictures according to the double picture method. One way of eliminating the secondary images includes the step of inserting in each one of the two beams of light emanating from the two pictures a polarizing filter, the polarizing planes of which are positioned differently from each other. These polarizing filters in combination with another set of polarizing filters, which preferably is arranged in rear of the projection objective, eliminate the secondary images. The proper registration of the primary images on the picture screen is accomplished by means of prisms, which are inserted in the two beams of light in such manner that they have the effect of dividing the projection objective in two halves. In a system of this type a considerable loss of light occurs, due to the insertion of two polarizing filters in each beam of light, and also due to the fact that a considerable amount of light, namely the one producing the secondary images, is kept away from the screen.

The principal object of the invention is to provide a projection device for stereo pictures which does not have the disadvantages above mentioned, but which also effectively eliminates the two secondary images.

In accordance with the invention, an optical system is arranged in the paths of the rays of the two pictures, which system includes in addition to the ordinary projection elements a polarizing filter for each of the two pictures and a double refractive means of such position and of such character that both images are projected onto the screen in proper superimposition, without the appearance of secondary images, and of such differently polarized condition as is required for viewing the projected image.

Other objects of the invention will be apparent or will be specifically pointed out in the following description with reference to the drawing, which illustrates by way of example two embodiments of the invention. It is believed to be obvious, that the invention is not limited to the embodiments herein described, as various other forms may be adopted within the scope of the claims.

Figure 2:
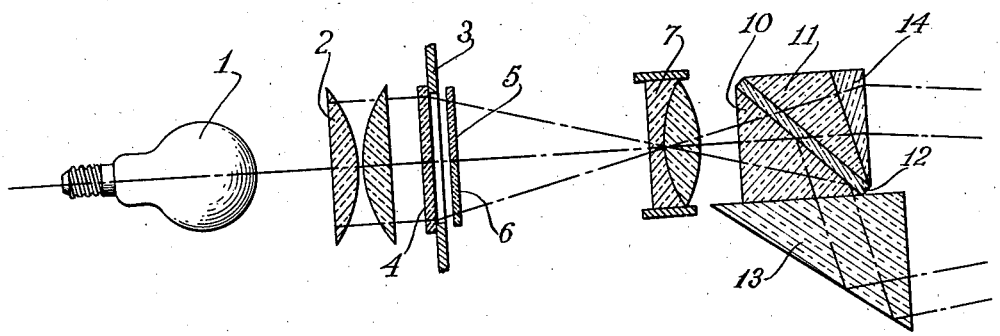

In the drawing:

Figure 1 illustrates diagrammatically the optical system of a device for projecting stereo pictures in accordance with the invention, and Figure 2 illustrates diagrammatically a modified embodiment of the invention.

Referring to Fig. 1, the light rays from a projection lamp 1 pass through a condenser lens system 2 to illuminate uniformly the opening of the picture window 3. A motion picture film 4 provided with pictures properly arranged in pairs, in each one of its frames is intermittently moved past the window 3 in any well known manner. In front of the window 3 are arranged in a single plane two polarizing filters 5 and 6 respectively, one for each of the pictures in the frame. The polarizing filters 5 and 6 are mounted in such a manner that their polarizing planes are positioned angularly with respect to each other, advisably at right angle to each other. Preferably, polarizing filters of the disc or foil type as are now on the market are used. The stereo pictures appearing in the picture window are projected by means of the objective 7 onto the screen 8.

A double refractive means 9 is inserted in the path of the light rays, preferably between the objective 7 and the screen 8.

The double refractive means illustrated in Fig. 1 consists of a Wollaston prism, whose aperture is of sufficient size to transmit without loss the entire light beam passing through the objective 7. The Wollaston prism consists in well known manner of two sections, the optical axis of one section being at right angles to the optical axis of the other and both of these axes being at right angles to the axis of the objective 7, when the prism is in action.

In the present instance each section consists of a right-angled prism arranged with their hypothenusal faces adjacent each other. A Wollaston prism of this construction has the property of emitting two beams of light the polarizing planes of which are at a right angle to each other.

The polarizing filters 5, 6 and the Wollaston prism 9 are arranged relatively to each other in such a manner, that the two light beams after passage through the polarizing filters, whose polarizing planes are at a right angle to each other, pass unrestricted through the Wollaston prism. This prism has now the additional property of deflecting the polarized light beams passing through the same. The angles of the prism are suitably calculated and selected, that there will appear on the screen two images in super position whose polarizing planes are at a right angle relation to each other.

In a normal Wollaston prism the polarizing planes of the two light beams are at a right angle to each other and are parallel and at a right angle respectively to the direction of deflection, and therefore the prism is preferably so positioned in the path of the light rays, that one of the two polarizing planes will be parallel to a line passing through the center points of the two associated pictures in each frame of the film.

The polarizing filters in the viewing goggles will then have to be positioned in the same manner, namely so that the plane of vibration of the light passing through one lens of the goggles is parallel to a line connecting the centers of the pairs of associated pictures.

In the modified embodiment illustrated in Fig. 2, all the parts up to the projection objective 7 are the same as in the first described embodiment and therefore are designated with the same reference characters. In place of the Wollaston prism, however, a glass compound body including the prisms 10 and 11 is employed. A plate 12 having parallel faces and consisting of double refractive material is inserted between the parallel disposed hypothenusal faces of the prisms 10 and 11.

There are known for instance double refractive materials in which $n_e=1.33$ and $n_o=1.60$. Since the light beams coming from the pair of pictures are differently polarized, one of the light beams will pass through the glass body 10, 11 containing the double refractive plate 12 without undergoing any change in direction. The other light beam, however, will be reflected owing to the difference in the refractive indices (glass body $n=1.5$, $n_e=1.33$).

The position of the plate 12 of double refractive material with respect to the optical axis is determined by the difference in refraction between the double refractive material and the glass cube 10, 11. For the above mentioned values the angle of inclination (angle of incidence) should be about 63°. The establishment of a certain predetermined angle between the double refractive plate and the optical axis is, however, not necessary, since it is only required that the light rays coming from one of the two associated pictures strike the reflecting plane of the prism combination 10, 11, 12 within the range of total reflection. The reflected beam of light is again reflected by additional prisms, for instance as shown in Fig. 2 by a prism 13, one side of which is placed against the bottom side of the prism 10. The prism 13 reflects this beam of light to the screen in such a manner that the image will register on the screen with the image produced by the other beam of light in accordance with the principle of stereo picture projection.

If desired, the prism structure 10, 11 may be made achromatic. This is accomplished according to Fig. 2, by cementing a suitable prism 14 with its hypothenusal face, to the side of the prism 11 facing the screen. In this manner the appearance of colored margins during the projection is eliminated.

What I claim is:

1. In a device for projecting stereoscopically associated pairs of pictures, the combination of a projection objective, a picture window in rear of said objective, polarizing filters adjacent and in front of said picture window, one for each of the two pictures of the pair to be projected, the axes of vibration of said polarizing filters being oriented in different planes, and double-refractive means in front of said objective adapted to project the stereoscopic pictures in the form of two superposed images of differently polarized light onto a screen without the formation of secondary images, said double-refractive means including at least two prisms arranged with their hypothenusal faces parallel and adjacent each other, one of said two prisms being a right-angled prism and being positioned with its optical axis at a right angle to the axis of said objective.

2. In a device for projecting stereoscopic pictures, the combination with a projection objective, of a picture window in rear of said objective, two polarizing filters adjacent and in front of said picture window, said polarizing filters being mounted in a common plane and having their polarizing planes positioned at an angle with respect to each other, one polarizing filter being positioned in front of one picture and the other polarizing filter being positioned in front of the other picture of the stereoscopic picture when the latter is placed in said picture window, and double refractive means in front of said objective, said objective and double refractive means being adapted to project the stereoscopic picture in the form of two superposed images of differently polarized light onto a screen, said double refractive means preventing the formation of secondary images and including at least two prisms arranged with their hypothenusal faces parallel and adjacent each other, one of said two prisms being a right-angled prism and being positioned with its optical axis at a right angle to the axis of said objective.

3. In a device for projecting stereoscopic pictures, the combination with a projection objective, of a picture window in rear of said objective, two polarizing filters adjacent and in front of said picture window, said polarizing filters being mounted in a common plane and having their polarizing planes positioned at an angle with respect to each other, one polarizing filter being positioned in front of one picture and the other polarizing filter being positioned in front of the other picture of the stereoscopic picture when the latter is placed in said picture window, and double refractive means in front of said objective, said objective and double refractive means being adapted to project the stereoscopic picture in the form of two superposed images of differently polarized light onto a screen, said double refractive means comprising a Wollaston prism adapted to prevent the formation of secondary images, said Wollaston prism consisting of two sections, each of which having its optical axis positioned at a right angle to the optical axis of said objective.

4. In a device for projecting stereoscopic pictures, the combination with a projection objective, of a picture window in rear of said objective, two polarizing filters adjacent and in front of said picture window, said polarizing filters being mounted in a common plane and having their polarizing planes positioned at an angle with respect to each other, one polarizing filter being positioned in front of one picture and the other polarizing filter being positioned in front of the other picture of the stereoscopic picture when the latter is placed in said picture window, and double refractive means in front of said objective, said objective and double refractive means being adapted to project the stereoscopic picture in the form of two superposed images of differently polarized light onto a screen, said double refractive means comprising a Wollaston prism having a sufficiently large aperture to transmit without loss the entire light beam leaving said objective, said prism preventing the formation of secondary images.

5. In a device for projecting stereoscopic pictures, the combination with a projection objective, of a picture window in rear of said objective, two polarizing filters adjacent and in front of said picture window, said polarizing filters being mounted in a common plane and having their polarizing planes positioned at an angle with respect to each other, one polarizing filter being positioned in front of one picture and the other polarizing filter being positioned in front of the other picture of the stereoscopic picture when the latter is placed in said picture window, and double refractive means in front of said objective, said objective and double refractive means being adapted to project the stereoscopic picture in the form of two superposed images of differently polarized light onto a screen, said double refractive means including two prisms arranged with their hypothenusal faces parallel to each other, and a double refractive plate having plane parallel faces mounted between the hypothenusal faces of said two prisms, one of said two prisms being right-angled and having one of its sides arranged at a right angle to the optical axis of said projection objective.

6. In a device for projecting stereoscopic pictures, the combination with a projection objective, of a picture window in rear of said objective, two polarizing filters adjacent and in front of said picture window, said polarizing filters being mounted in a common plane and having their polarizing planes positioned at an angle with respect to each other, one polarizing filter being positioned in front of one picture and the other polarizing filter being positioned in front of the other picture of the stereoscopic picture when the latter is placed in said picture window, and double refractive means in front of said objective, said objective and double refractive means being adapted to project the stereoscopic picture in the form of two superposed images of differently polarized light onto a screen, said double refractive means including two prisms arranged with their hypothenusal faces parallel to each other, a double refractive plate having plane parallel faces mounted between the said hypothenusal faces of said two prisms, and additional optical means for causing said two images to appear in proper superposition on the screen.

7. In a device for projecting stereoscopic pictures, the combination with a projection objective, of a picture window in rear of said objective, two polarizing filters adjacent and in front of said picture window, said polarizing filters being mounted in a common plane, and having their polarizing planes positioned at an angle with respect to each other, one polarizing filter being positioned in front of one picture and the other polarizing filter being positioned in front of the other picture of the stereoscopic picture when the latter is placed in said picture window, and double refractive means in front of said objective, said objective and double refractive means being adapted to project the stereoscopic picture in the form of two superposed images of differently polarized light onto a screen, said double refractive means including two prisms arranged with their hypothenusal faces parallel to each other, a double refractive plate having plane parallel faces mounted between the said hypothenusal faces of said two prisms, and another prism placed with one of its sides against a side of one of said first named prisms for causing said two images to appear in proper superposition on the screen.

8. In a device for projecting stereoscopic pictures, the combination with a projection objective, of a picture window in rear of said objective, two polarizing filters adjacent and in front of said picture window, said polarizing filters being mounted in a common plane and having their polarizing planes positioned at an angle with respect to each other, one polarizing filter being positioned in front of one picture and the other polarizing filter being positioned in front of the other picture of the stereoscopic picture when the latter is placed in said picture window, double refractive means in front of said objective, said objective and double refractive means being adapted to project the stereoscopic picture in the form of two superposed images of differently polarized light onto a screen, said double refractive means including two prisms arranged with their hypothenusal faces parallel to each other, a double refractive plate mounted between the said hypothenusal faces of said two prisms, a third prism placed with one of its sides against a side of one of said first named prisms, and means making said double refractive means achromatic.

9. In a device for projecting stereoscopic pictures, the combination with a projection objective, of a picture window in rear of said objective, two polarizing filters adjacent and in front of said picture window, said polarizing filters being mounted in a common plane and having their polarizing planes positioned at an angle with respect to each other, one polarizing filter being positioned in front of one picture and the other polarizing filter being positioned in front of the other picture of the stereoscopic picture when the latter is placed in said picture window, and double refractive means in front of said objective, said objective and double refractive means being adapted to project the stereoscopic picture in the form of two superposed images of differently polarized light onto a screen, said double refractive means including two prisms arranged with their hypothenusal faces parallel to each other, a double refractive plate having plane parallel faces mounted between the said hypothenusal faces of said two prisms, a third prism placed with one of its sides against one side of one of said first named two prisms for deflecting one of the two images onto the screen, and a fourth prism placed with its hypothenusal face against one side of the other one of said first named two prisms for making the prism assembly achromatic.

HANS SAUER.